Figure 1:
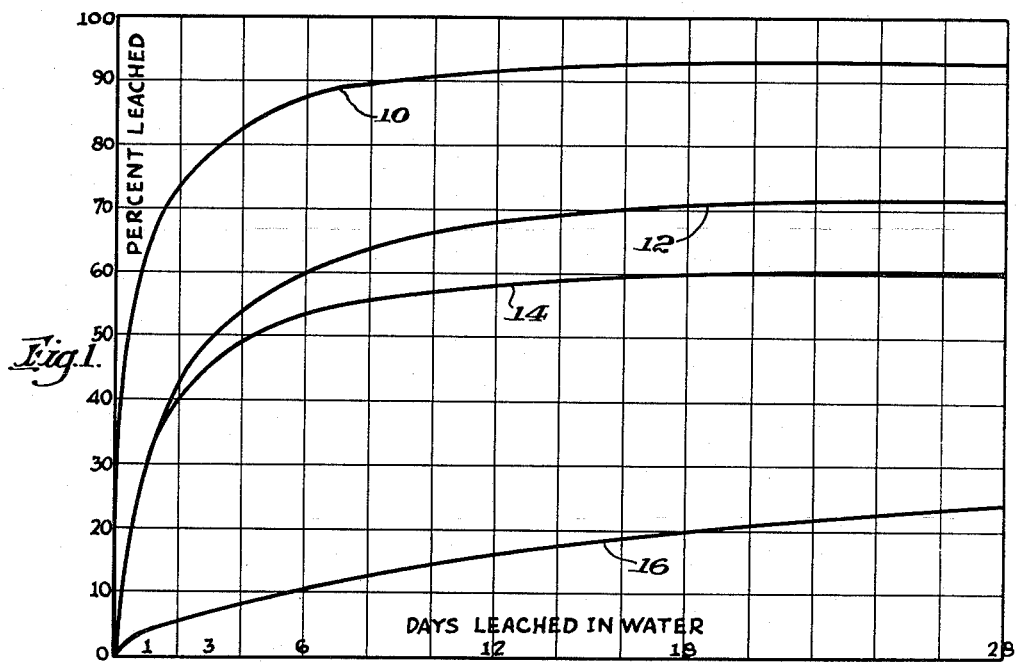

March 13, 1951      R. H. BESCHER      2,545,222

WOOD PRESERVATION

Filed April 27, 1948

INVENTOR.
RALPH H. BESCHER.
BY Edmund J. Borden
his ATTORNEY.

Patented Mar. 13, 1951

2,545,222

UNITED STATES PATENT OFFICE 2,545,222

WOOD PRESERVATION

Ralph H. Bescher, Orrville, Ohio, assignor to Koppers Company, Inc., Pittsburgh, Pa., a corporation of Delaware Application April 27, 1948, Serial No. 23,547

9 Claims. (Cl. 117—137)

This invention relates to wood preservation. More particularly the invention relates to wood which is treated to preserve it from destruction by fungi, rot and other organisms and at the same time to make the wood resistant to fire.

A wood which is fire-retardant and especially a wood which is fire-resistant is very much desired in the industry.

Zinc chloride has been extensively used as a wood preservative because it is a poison to the destructive fungi, insects and other organisms, and is a fire-retardant. Water solutions of zinc chloride are used for impregnating the wood but it has been found that the zinc chloride may be readily removed from the wood by weathering and leaching. The resistance to the removal of the zinc chloride from the wood by leaching and the fire-resistance properties of zinc chloride may be greatly improved by treating the zinc chloride with sodium dichromate. However, tests have shown that wood treated with chromated zinc chloride and then exposed to fire has a distinct afterglow which destroys the wood and allows the fire to spread.

The primary object of the present invention is to provide a treated wood which is preserved against destruction by organisms, is fire-resistant, and will prevent fire-spread and fire-afterglow.

Another object of the invention is to provide a treated wood which is preserved against destruction by organisms, is fire-resistant and is waterproof and weather-resistant.

A further object of the invention is to provide a wood which is treated with a chromated zinc chloride that will not have a fire-afterglow or promote a fire-spread.

With these and other objects in view, the invention consists in the fire-resistant wood hereinafter described and particularly defined in the claims.

The fireproofing materials with which the wood is impregnated to make the wood resistant against organisms, fire-glow and fire-spread, is composed of a mixture of chromated zinc chloride with boric acid and an ammonium salt. The chromated zinc chloride is made up of 81.5% zinc chloride and 18.5% dihydrate sodium dichromate. The ammonium salts which are particularly adapted for fireproofing the impregnating composition are ammonium chloride, ammonium sulphate, ammonium phosphate, and ammonium sulfamate.

The preferred treating solution is composed of approximately 80% chromated zinc chloride, 10% boric acid and 10% ammonium sulphate. All of these compounds are readily soluble in water, the impregnating solution being made up of from 10 to 16% by weight of the compounds dissolved in 90 to 84% water. The impregnating solution is forced into the wood to be treated by inserting the wood in a treating chamber, filling the impregnating chamber around the wood with the treating solution, heating the solution to a temperature of 150 to 200° F., and placing the solution in the cylinder under a pressure of 100 to 250 lbs. per square inch. The wood is held under heat and pressure for a sufficient period of time so that the outer layers of the wood will contain three lbs. of solid salts per cubic foot of wood. Where comparatively thin pieces of wood are saturated with the solution the concentration of the impregnating salts or compounds is substantially uniform throughout the body of the wood. Where comparatively large timbers are impregnated the concentration of the compounds in the wood will vary from three lbs. in the outer layers of the wood to one and one-half lbs. at the inner or central portions of the wood per cubic foot of wood.

The preferred impregnating solution defined above is quite resistant to weather and leaching but many tests have shown that the wood will lose a considerable portion of the treating compounds when leached over an extended period by being immersed in water, either standing in the water or being treated by running water, or being treated in a plurality of successive portions of water.

To avoid leaching and weathering of the preserved and fireproofed wood a fireproof coating is placed over the wood which is waterproof and weatherproof.

The preferred coating for the impregnated wood is made up of 80% of coal tar sold on the market under the trade name "RT-12" and 20% of trichlorobenzene or 20% dichloronaphthalene. The coal tar mentioned above preferably has coal dissolved in solvent and blended therewith together with high boiling tar oils which make the tar resistant to temperature changes. That is, the tar is not brittle at temperatures below 0° F. and will not flow on a vertical surface at temperatures up to 150° F. The chlorinated hydrocarbons, such as trichlorobenzene or dichloronaphthalene, preferably contain 50% or more by weight of chlorine. When these chlorinated hydrocarbons are dissolved in the coal tar, the coal tar is fire-resistant and will not burn or give an afterglow.

The fire-resistant tar may be applied to the impregnated wood before or after it has been dried by placing the impregnated wood in a treating cylinder and immersing the wood in the fireproofed tar compound while heated to a temperature of 150° to 200° F. and under a pressure of approximately 30 lbs. per square inch. This coating can be obtained in a period of from five to thirty minutes, and then the coating material is drained from the wood. When the coating dries it forms a continuous non-tacky film varying in thickness from $\frac{1}{32}$ to $\frac{1}{16}$ of an inch. This coating is waterproof and will practically prevent the leaching of the water-soluble impregnating salts out of the wood.

In Figure 1 of the drawing is graphically illustrated some leaching tests of yellow pine wood blocks which were ⅝ of an inch by one inch by two inches in dimensions, which blocks contain 1.14 cubic inches of volume and 7.36 square inches of surface area in which 1.16 square inches are end grain surfaces. The treating solutions were fire-retardant salts having the concentrations described above. In the case of straight zinc chloride, the concentration of zinc chloride is the same as that of the chromated zinc chloride described above. The treated blocks were dried and then immersed in water for twenty-eight days, the water being changed daily and analyzed for leached salts. The amount of leaching is illustrated as ordinates and the time of leaching as abscissas. For example the combined weights of salts recovered from the leaching waters at the ends of one, three, six, twelve, eighteen and twenty-eight days as a percentage of the total weight of salt in the original sample, gave the points on the curves.

Curve 10 is zinc chloride.

Curve 12 is chromated zinc chloride.

Curve 14 is chromated zinc chloride treated with ammonium sulphate and boric acid; and Curve 16 is treated with chromated zinc chloride, ammonium sulphate and boric acid, and coated with fireproofed coal tar.

Figure 2:
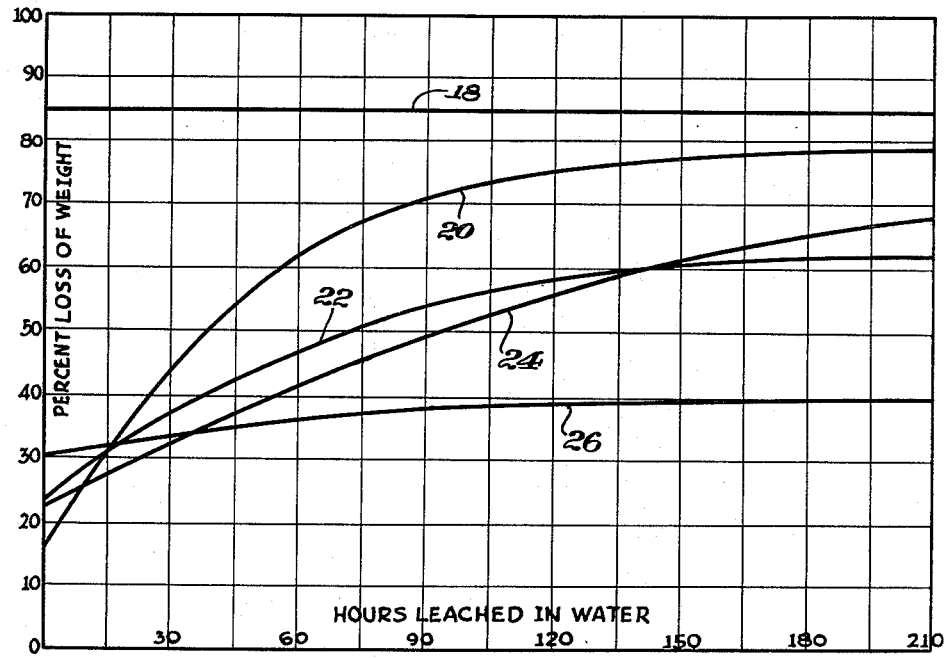

In Figure 2 is graphically illustrated some leaching tests of yellow pine sapwood sticks ⅜ x 1⅝ x 28 inches in length. These sticks were pressure treated with solutions of fire-retardant salts having the concentrations described above. The treated sticks were dried and alternately immersed in running water for eight hours, then air dried for sixteen hours, these treatments being continued over a total period including 256 hours of immersion and 512 hours of air drying, or 32 days. The curve does not show the total length of the leaching period, but shows the trend of the leaching over this period. To obtain the points on the curves a sample stick was removed every thirty hours for each curve, then air-dried to a percentage of moisture of 7% to ±3% and then burned in the standard test apparatus of the U. S. Forest Products Laboratory "Fire-Tube Test." That is, the sample stick was dried then put into a fire-tube and ignited by a Bunsen burner which continued to burn for four minutes, the burner then being removed and the sample allowed to burn until it came to a constant weight. The burned samples for each curve were removed from the fire-tube and weighed and their weights in percentage of the weights of the original sample sticks undergoing tests gave the points for each of the curves. These weights of the burned wood samples gave the points on the curves for the different fire resistant treatments as described below. The curve 18 had no treatment with fire-resistant salts and was consumed to the extent of about 85%. Curves 20, 22, 24 and 26 show the amount of sample stick consumed for the different periods of time for samples having different kinds of fire-resistant treatments.

Curve 18 is untreated wood.

Curve 20 is wood which is treated with straight zinc chloride.

Curve 22 are the wood blocks treated with chromated zinc chloride and ammonium sulphate and boric acid.

Curve 24 are wood blocks treated with straight chromated zinc chloride; and

Curve 26 are wood blocks treated with chromated zinc chloride, treated with boric acid and ammonium sulphate, and then coated with fireproofed coal tar.

These curves graphically illustrate the effectiveness of the chromated zinc chloride which has been treated with boric acid and ammonium sulphate, and particularly the same type of block which has been coated with coal tar to show its resistance against leaching. It will be noted that the chromated zinc chloride blocks treated with the boric acid and ammonium sulphate contain a sufficient amount of fireproof salts to make the blocks fireproof and glowproof even after the severe leaching tests.

In place of the fireproof coal tar used for coating, as described above, the following fireproof coating may be used:

*Formula 2*

80% chlorinated paraffin (55% chlorine)
20% resin solution (phenol-formaldehyde)

*Formula 3*

50% chlorinated paraffin (70% chlorine)
1.5% paraffin
23.5% dichloronaphthalene or trichlorobenzene
25% linseed oil plus drier The phenolic resin of Formula 2 is the film-forming material, the chlorinated paraffin acting as the fireproofing material. In the third formula linseed oil with paraffin are the film-forming materials and the chlorinated paraffin and dichloronaphthalene or trichlorobenzene are the fireproofing materials.

The preferred form of the invention having been thus described, what is claimed as new is:

1. A fire-resistant wood comprising: a wood impregnated with a mixture by weight of 80% chromated zinc chloride, 10% boric acid, and 10% ammonium sulphate.

2. The product defined in claim 1 in which the chromated zinc chloride is composed by weight of 18.5% dihydrated sodium dichromate and 81.5% zinc chloride.

3. The product defined in claim 2 in which the fireproofing impregnating material consists of reaction products by weight of 65.2% $ZnCl_2$, 14.8% dihydrated sodium dichromate, 10% boric acid, and 10% ammonium sulphate.

4. The product defined in claim 2 in which the wood contains from one to three lbs. of impregnating compounds by weight per cubic foot of wood.

5. The product defined in claim 1 which is enclosed in a fire-proof and water-proof coating, said coating composed of a chlorinated hydrocarbon dissolved in a water-proof film-forming material.

6. The product defined in claim 5 in which the film-forming material is a phenol-formaldehyde resin.

7. The product defined in claim 6 in which the coating is composed of 80% chlorinated paraffin wax and 20% phenol-formaldehyde resin.

8. The product defined in claim 5 which is enclosed in a waterproof coating composed by weight of 80% coal tar and 20% trichlorobenzene.

9. The product defined in claim 8 in which the trichlorobenzene contains at least 50% of chlorine by weight.

RALPH H. BESCHER.

REFERENCES CITED

The following references are of record in the file of this patent:

UNITED STATES PATENTS

| Number | Name | Date |
|---|---|---|
| 914,300 | McElroy et al. | Mar. 2, 1909 |
| 1,194,558 | Skoglund | Aug. 15, 1916 |
| 1,527,330 | Rice | Feb. 24, 1925 |
| 1,766,606 | Coolidge | June 24, 1930 |
| 1,994,073 | Hartman et al. | Mar. 12, 1935 |
| 2,381,049 | Hammond | Aug. 7, 1945 |

FOREIGN PATENTS

| Number | Country | Date |
|---|---|---|
| 428,873 | Great Britain | May 21, 1935 |